United States Patent
Sugiura et al.

(10) Patent No.: US 7,723,434 B2
(45) Date of Patent: May 25, 2010

(54) OLEFINIC THERMOPLASTIC ELASTOMER AND MOLDINGS THEREOF

(75) Inventors: Motoyuki Sugiura, Anjo (JP); Toru Tamura, Handa (JP); Takamitsu Kano, Aichi (JP); Toru Kato, Aichi (JP)

(73) Assignee: Nof Corporation, Tokyo (JP)

( * ) Notice: Subject to any disclaimer, the term of this patent is extended or adjusted under 35 U.S.C. 154(b) by 672 days.

(21) Appl. No.: 10/509,421

(22) PCT Filed: Mar. 27, 2003

(86) PCT No.: PCT/JP03/03889

§ 371 (c)(1),
(2), (4) Date: Aug. 2, 2005

(87) PCT Pub. No.: WO03/080723

PCT Pub. Date: Oct. 2, 2003

(65) Prior Publication Data

US 2005/0288434 A1 Dec. 29, 2005

(30) Foreign Application Priority Data

Mar. 27, 2002 (JP) .............................. 2002-087947

(51) Int. Cl.
*C08L 51/00* (2006.01)
*C08L 51/06* (2006.01)
*C08L 53/00* (2006.01)

(52) U.S. Cl. .............................. 525/79; 525/80; 525/84; 525/85; 525/87

(58) Field of Classification Search .................. 525/79, 525/80, 84, 85, 87
See application file for complete search history.

(56) References Cited

U.S. PATENT DOCUMENTS

| 3,806,558 A | 4/1974 | Fischer ...................... 260/897 |
| 4,555,546 A | 11/1985 | Patel .......................... 525/194 |

FOREIGN PATENT DOCUMENTS

| JP | 03-296559 | 12/1991 |
| JP | 04-048817 | 2/1992 |
| JP | 06-136070 | 5/1994 |
| JP | 06-306253 | 11/1994 |
| JP | 07-331089 | 12/1995 |
| JP | 08-225778 | 9/1996 |
| JP | 2001-240623 | 9/2001 |
| JP | 2001-342321 | 12/2001 |
| JP | 2002-020576 | 1/2002 |

OTHER PUBLICATIONS

Fusushima, electronic translation of JP 2002-020576, Jan. 2002.*
Fusushima, CAPLUS AN 2002:63599, abstracting JP 2002-020576, Jan. 2002.*

* cited by examiner

*Primary Examiner*—Jeffrey C Mullis
(74) *Attorney, Agent, or Firm*—Morris, Manning & Martin LLP; Tim Tingkang Xia

(57) ABSTRACT

An olefinic thermoplastic elastomer with improved properties can be obtained by melting and kneading a graft copolymer, acrylic rubber, a crosslinking agent, and a co-crosslinking agent. The graft copolymer is composed of an olefin polymer segment formed from a nonpolar α-olefin monomer and a vinyl polymer segment formed from a vinyl monomer, with particles of one segment being dispersed in the other segment. The particle diameter is 0.01 to 1 μm. The acrylic rubber can be obtained by polymerizing a monomer mixture containing methoxyethyl acrylate.

24 Claims, No Drawings

OLEFINIC THERMOPLASTIC ELASTOMER AND MOLDINGS THEREOF

TECHNICAL FIELD

The present invention relates to an olefinic thermoplastic elastomer and a molding made from the elastomer.

BACKGROUND ART

Acrylic rubber exhibits excellent oil resistance, heat resistance, and ozone resistance, and is therefore used in various hoses and seals, such as packings and gaskets.

Hoses and seals using acrylic rubber are produced by mixing acrylic rubber with a filler, an antioxidant, a processing aid, and a vulcanizing agent, molding by vulcanization, and then further carrying out secondary vulcanization. The vulcanizing steps complicate a process for producing a molding of acrylic rubber, and make it difficult to recycle a molding of acrylic rubber or a defective product generated during production of the molding.

In recent years, an olefinic thermoplastic elastomer has been widely used in place of vulcanized rubber in interior and exterior parts of automobiles and in the field of electric appliances.

For example, an olefinic thermoplastic elastomer comprising polypropylene and ethylene-propylene rubber (see Patent Document 1: Japanese Laid-Open Patent Publication No. 4826838 (pages 38 to 60)) and an olefinic thermoplastic elastomer comprising polypropylene and acrylonitrile-butadiene rubber (hereinafter abbreviated to NBR) (see Patent Document 2: Japanese Laid-Open Patent Publication No. 4-48817 (pages 5 to 12)) are known.

Since olefin resins and acrylic rubbers are inherently incompatible with each other, a favorable olefinic thermoplastic elastomer cannot be obtained if an olefin resin and acrylic rubber are simply blended. In this context, an olefinic thermoplastic elastomer produced by adding a compatibilizer that enhances compatibility between olefin resins and acrylic rubbers is known (see Patent Document 3: Japanese Laid-Open Patent Publication No. 60-156738 (pages 38 to 69)).

However, the olefinic thermoplastic elastomer disclosed in Patent Document 1 exhibits inferior oil resistance, and the olefinic thermoplastic elastomer disclosed in Patent Document 2 exhibits excellent oil resistance, but exhibits inferior heat resistance and weather resistance. Therefore, parts made of the elastomers of Patent Documents 1 and 2 are not suitable for use in places requiring both oil resistance and heat resistance, such as engine rooms in automobiles. Since olefin resins and acrylic rubbers are not sufficiently compatible in the olefinic thermoplastic elastomer of Patent Document 3, parts made of the elastomer still do not have sufficient oil resistance.

As described above, the olefinic thermoplastic elastomers of the prior art do not satisfy requirements for oil resistance, heat resistance, mechanical properties (which refer to compression set, tensile strength, elongation at break (or fracture elongation), and hardness in this specification), moldability, and recycling characteristics.

SUMMARY OF THE INVENTION

An object of the present invention is to provide an olefinic thermoplastic elastomer with improved properties.

The olefinic thermoplastic elastomer according to the present invention is obtained by melting and kneading ingredients including a graft copolymer composed of an olefin polymer segment or olefin copolymer segment formed from a nonpolar α-olefin monomer and a vinyl polymer segment, with one segment having a particle diameter of 0.01 to 1 μm being dispersed in the other segment; an acrylic rubber formed from a monomer mixture in which 10 to 90 wt % of methoxyethyl acrylate, 5 to 85 wt % of alkyl acrylate, 5 to 15 wt % of acrylonitrile, and 0.1 to 0.10 wt % of allyl methacrylate are contained as main components; 0.01 to 10 wt % of a crosslinking agent with respect to the total amount of the graft copolymer and the acrylic rubber; and 0.01 to 10 wt % of a co-crosslinking agent with respect to the total amount of the graft copolymer and the acrylic rubber.

DETAILED DESCRIPTION OF THE PREFERRED EMBODIMENT

In the following description, the "olefin polymer segment or olefin copolymer segment" is abbreviated to olefin (co)polymer segment.

The olefinic thermoplastic elastomer of the present invention can be obtained by melting and kneading a graft copolymer, acrylic rubber formed from a monomer mixture containing methoxyethyl acrylate, alkyl acrylate, acrylonitrile, or allyl methacrylate as main components, a crosslinking agent, and a co-crosslinking agent.

First, the graft copolymer will be described. A graft copolymer usually has a structure having an olefin polymer segment as a backbone component and a vinyl polymer segment as a branch component. However, a graft copolymer having an H-shaped structure may be produced, or a graft copolymer having an irregular polyphase structure may be produced, depending on the conditions. Examples of the graft copolymer having a polyphase structure include a copolymer in which one segment forms dispersed phases (islands) as minute particles in the matrix (sea) of the other segment. The graft copolymer used in the present invention is composed of an olefin (co)polymer segment formed from a nonpolar α-olefin monomer and a vinyl polymer segment, with particles of one segment being dispersed in the other segment. The particle diameter is preferably 0.01 to 1 μm, and more preferably 0.1 to 1 μm. If the particle diameter is less than 0.01 μm or more than 1 μm, such a graft copolymer has insufficient compatibility with the acrylic rubber, and appearance of a molding of the olefinic thermoplastic elastomer or mechanical properties of the elastomer deteriorates undesirably.

The olefin (co)polymer is a homopolymer of a nonpolar α-olefin monomer or a copolymer of two or more nonpolar α-olefin monomers, obtained by high-pressure radical polymerization, medium-pressure or low-pressure ionic polymerization, or the like.

Examples of the nonpolar α-olefin monomer include ethylene, propylene, 1-butene, 1-pentene, 1-hexene, and 4-methyl-1-pentene. Of these, ethylene and propylene are preferable.

Specific examples of the olefin (co)polymer include low-density polyethylene, very low-density polyethylene, ultralow-density polyethylene, low-molecular-weight polyethylene, polypropylene, and an ethylene-propylene copolymer. Of these, polypropylene and an ethylene-propylene copolymer are preferable from the viewpoint of oil resistance and mechanical properties. An oil-resistant ethylene-propylene copolymer is particularly preferable. The oil-resistant ethylene-propylene copolymer is homopolypropylene, an ethylene-propylene block copolymer with ethylene content of 10 wt % or less, or an ethylene-propylene random copolymer with ethylene content of 5 wt % or less. A mixture of two or more such olefin (co)polymers may also be used.

The weight average molecular weight of the olefin (co) polymer is preferably 5,000 to 3,000,000, more preferably 10,000 to 2,000,000, and still more preferably 50,000 to 1,000,000. If the weight average molecular weight is less than 5,000 or more than 3,000,000, mechanical properties and moldability of the olefinic thermoplastic elastomer tend to decrease.

Next, the vinyl polymer segment will be described. The vinyl monomer as a main raw material for forming the vinyl polymer segment is preferably a monomer which is highly compatible with the acrylic rubber. Examples of the monomer are vinyl aromatics, such as styrene, methylstyrene, dimethylstyrene, ethylstyrene, isopropylstyrene, and chlorostyrene; α-substituted styrenes, such as α-methylstyrene and α-ethylstyrene; (meth)acrylate monomers, such as methyl (meth) acrylate, ethyl (meth)acrylate, propyl (meth)acrylate, butyl (meth)acrylate, pentyl (meth)acrylate, hexyl (meth)acrylate, heptyl (meth)acrylate, 2-ethylhexyl (meth)acrylate, octyl (meth)acrylate, nonyl (meth)acrylate, decyl (meth)acrylate, and dodecyl (meth)acrylate; alkoxyalkyl acrylate monomers, such as ethoxyethyl acrylate, methoxyethyl acrylate, butoxyethyl acrylate, and ethoxypropyl acrylate; vinyl cyanide monomers, such as acrylonitrile and methacrylonitrile; and hydroxyl group-containing monomers, such as hydroxyethyl (meth)acrylate and hydroxypropyl (meth)acrylate. These may be used simply or in a combination of two or more. Of these, styrene, ethyl acrylate, butyl acrylate, methoxyethyl acrylate, acrylonitrile, and hydroxypropyl (meth)acrylate are particularly preferable.

A vinyl polymer obtained by copolymerizing the vinyl monomer and a polyfunctional monomer or a monomer having a crosslinkable functional group may be used. The monomer having a crosslinkable functional group is, specifically, an active chlorine-containing monomer, an epoxy group-containing monomer, a carboxyl group-containing monomer, or an unsaturated group-containing monomer.

Examples of the polyfunctional monomer are bifunctional acrylate, bifunctional methacrylate, trifunctional acrylate, trifunctional methacrylate, and divinylbenzene.

Examples of the active chlorine-containing monomer include 2-chloroethyl vinyl ether, vinylbenzyl chloride, vinyl chloroacetate, allyl chloropropionate, allyl chloroacetate, and allyl chloropropionate. 2-chloroethyl vinyl ether and vinyl chloroacetate are preferable.

Examples of the epoxy group-containing monomer include glycidyl acrylate, glycidyl methacrylate, glycidyl itaconate, allyl glycidyl ether, 2-methylallyl glycidyl ether, 3,4-epoxybutene, 3,4-epoxy-methyl-1-butene, 3,4-epoxy-1-pentene, 3,4-epoxy-3-methylpentene, and p-glycidylstyrene. Glycidyl acrylate, glycidyl methacrylate, and allyl glycidyl ether are preferable.

Examples of the carboxyl group-containing monomer include acrylic acid, methacrylic acid, crotonic acid, itaconic acid, and cinnamic acid. Acrylic acid and methacrylic acid are preferable.

Examples of the unsaturated group-containing monomer include allyl acrylate, allyl methacrylate, and allyl glycidyl ether. Allyl methacrylate is preferable.

The amount of the polyfunctional monomer or the monomer having a crosslinkable functional group used in the vinyl copolymer is 20 wt % or less, and preferably 10 wt % or less. If the percentage exceeds 20 wt %, moldability and mechanical properties of the olefinic thermoplastic elastomer undesirably tend to deteriorate. The monomer having a crosslinkable functional group used may be appropriately selected according to the type of the crosslinking agent.

The number average degree of polymerization of the vinyl copolymer which is to be the vinyl polymer segment is preferably 5 to 10,000, more preferably 10 to 5,000, and most preferably 100 to 2,000. If the number average degree of polymerization is less than 5, moldability of the olefinic thermoplastic elastomer is improved. However, compatibility between such a graft copolymer and the acrylic rubber deteriorates, and appearance of a molding of the olefinic thermoplastic elastomer tends to deteriorate. If the number average degree of polymerization exceeds 10,000, melt viscosity of the olefinic thermoplastic elastomer is high, moldability tends to decrease, and surface gloss of a molding tends to decrease.

The percentage of the olefin (co)polymer segment formed from the nonpolar α-olefin monomer contained in the graft copolymer is preferably 5 to 95 wt %, more preferably 20 to 90 wt %, and most preferably 30 to 80 wt %. Accordingly, the percentage of the vinyl copolymer is 95 to 5 wt %, more preferably 80 to 10 wt %, and most preferably 70 to 20 wt %. If the percentage of the olefin (co)polymer formed from the nonpolar α-olefin monomer in the graft copolymer is less than 5 wt %, moldability of the olefinic thermoplastic elastomer is not sufficiently improved. In contrast, if the percentage exceeds 95 wt %, moldability is sufficiently improved. However, compatibility between the graft copolymer and the acrylic rubber deteriorates, and mechanical properties of the olefinic thermoplastic elastomer tend to decrease.

Next, the grafting precursor will be described. The grafting precursor has a structure in which a copolymer of the vinyl monomer and a radically polymerizable organic peroxide (hereinafter abbreviated to vinyl copolymer having a peroxide bond) is dispersed in particles of the above olefin (co) polymer formed from the nonpolar α-olefin monomer.

The radically polymerizable organic peroxide is a monomer having an ethylenically unsaturated group and a peroxide bond group. The peroxide is preferably a monomer represented by the formula (1) or formula (2):

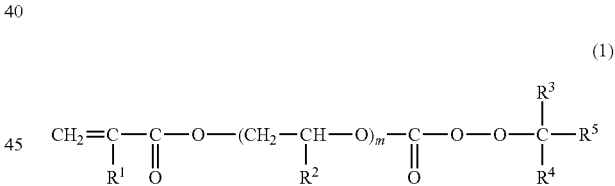
(1)

wherein $R^1$ represents hydrogen atom or a $C_1$ to $C_2$ alkyl group, $R^2$ represents hydrogen atom or methyl group, $R^3$ and $R^4$ independently represent a $C_1$ to $C_4$ alkyl group, $R^5$ represents a $C_1$ to $C_{12}$ alkyl group, phenyl group, an alkyl-substituted phenyl group, or a $C_3$ to $C_{12}$ cycloalkyl group, and m is an integer of 1 or 2;

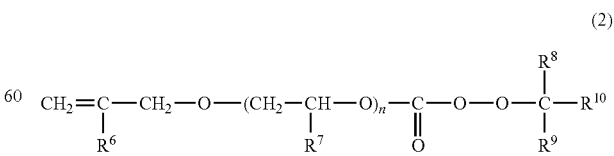
(2)

wherein $R^6$ represents hydrogen atom or a $C_1$ to $C_4$ alkyl group, $R^7$ represents hydrogen atom or methyl group, $R^8$ and $R^9$ independently represent a $C_1$ to $C_4$ alkyl group, $R^{10}$ represents a $C_1$ to $C_{12}$ alkyl group, phenyl group, an alkyl-substituted phenyl group, or a $C_3$ to $C_{12}$ cycloalkyl group, and n is an integer of 0, 1, or 2.

Of these, radically polymerizable organic peroxides, such as t-butylperoxyacryloyloxyethyl carbonate, t-butylperoxymethacryloyloxyethyl carbonate, t-butylperoxyallyl carbonate, and t-butylperoxymethallyl carbonate are preferable.

The percentage of the olefin (co)polymer part formed from the nonpolar α-olefin monomer contained in the grafting precursor is preferably 5 to 95 wt %, more preferably 20 to 90 wt %, and most preferably 30 to 80 wt %. Accordingly, the percentage of the vinyl copolymer is 95 to 5 wt %, more preferably 80 to 10 wt %, and most preferably 70 to 20 wt %.

If the percentage of the olefin (co)polymer formed from the nonpolar α-olefin monomer is less than 5 wt %, the effect of improving moldability is insufficient. If the percentage of the olefin (co)polymer formed from the nonpolar α-olefin monomer exceeds 95 wt %, the effect of improving moldability is obtained. However, compatibility with the acrylic rubber deteriorates, and mechanical properties tend to deteriorate.

The number average degree of polymerization of the vinyl copolymer having a peroxide bond for forming the vinyl polymer segment of the present invention is preferably 5 to 10,000, more preferably 10 to 5,000, and most preferably 100 to 2,000.

If the number average degree of polymerization is less than 5, moldability of the olefinic thermoplastic elastomer is improved. However, compatibility between the grafting precursor and the acrylic rubber decreases, and appearance of a molding tends to deteriorate. If the number average degree of polymerization exceeds 10,000, melt viscosity of the olefinic thermoplastic elastomer is high, moldability tends to decrease, and surface gloss of a molding tends to decrease.

The graft copolymer used in the present invention can be obtained by melting and kneading the grafting precursor. The peroxide bond in the vinyl copolymer is cleaved by heating during melting and kneading to produce a radical. The radical abstracts hydrogen from the olefin (co)polymer formed from the nonpolar α-olefin monomer. The vinyl copolymer is successively grafted to the olefin (co)polymer to produce the graft copolymer. Such a production method is simple, has high grafting efficiency, does not cause secondary aggregation of the vinyl polymer segment due to heating, makes the graft copolymer easily mixed with the acrylic rubber, and exhibits excellent interaction between the vinyl copolymer and the olefin (co)polymer.

As a kneader for melting and kneading, specifically, Banbury mixer, pressure kneader, kneading extruder, biaxial extruder, or roll is used. The kneading temperature is in the range of preferably 100 to 300° C., and more preferably 120 to 280° C. If the temperature is below 100° C., melting is inadequate, and mixing is insufficient due to high melt viscosity, whereby undesirably phase separation or delamination occurs in a molding. In contrast, if the temperature is above 300° C., the resin subjected to mixing undesirably easily decomposes or gelates.

A method for producing the grafting precursor of the present invention will be specifically described in detail.

The grafting precursor can be obtained by immersing the vinyl monomer, the radically polymerizable organic peroxide, and a radical polymerization initiator in particles of the olefin (co)polymer formed from the nonpolar α-olefin monomer and then copolymerizing the vinyl monomer and the radically polymerizable organic peroxide. In particular, 100 parts by weight of the olefin (co)polymer formed from the nonpolar α-olefin monomer is suspended in water. A solution of 5 to 1,900 parts by weight of at least one such vinyl monomer, 0.1 to 10 parts by weight of one such radically polymerizable organic peroxide shown by the formula (1) or (2) or a mixture of two or more such peroxides with respect to 100 parts by weight of the vinyl monomer, and 0.01 to 5 parts by weight of a radical polymerization initiator, having a decomposition temperature for obtaining half-life of ten hours of 40 to 90° C., with respect to 100 parts by weight of the total amount of the vinyl monomer and the radically polymerizable organic peroxide is separately prepared. This solution is added to the suspension to prepare an aqueous suspension.

The olefin (co)polymer formed from the nonpolar α-olefin monomer is preferably in the form of particles. The particle diameter is preferably 10 mm or less, and more preferably 5 mm or less.

Next, the aqueous suspension is heated under conditions where the radical polymerization initiator does not substantially decompose. The vinyl monomer, the radically polymerizable organic peroxide, and the radical polymerization initiator are immersed in particles of the olefin (co)polymer formed from the nonpolar α-olefin monomer by this heating. Then, the vinyl monomer and the radically polymerizable organic peroxide are copolymerized in the particles of the olefin (co)polymer by raising the temperature of the aqueous suspension to obtain the grafting precursor.

The vinyl copolymer in the grafting precursor preferably contains active oxygen in an amount of 0.003 to 0.73 wt %. If the amount of active oxygen is less than 0.003 wt %, grafting capability of the grafting precursor undesirably extremely decreases. If the amount exceeds 0.73 wt %, large amount of a gel is undesirably produced during grafting.

The amount of active oxygen can be calculated by extracting the vinyl copolymer from the grafting precursor by solvent extraction and determining the amount of active oxygen in the vinyl copolymer by iodometry.

The acrylic rubber used in the present invention can be obtained by copolymerizing a monomer mixture containing methoxyethyl acrylate, alkyl acrylate, acrylonitrile, and allyl methacrylate. These four essential monomers are main components of the monomer mixture and are contained in the monomer mixture usually in an amount of 50 wt % or more. The four essential monomers improve oil resistance, heat resistance, mechanical properties, and moldability of the acrylic rubber. Methoxyethyl acrylate is preferably contained in an amount of 10 to 90 wt %, alkyl acrylate is preferably contained in an amount of 5 to 85 wt %, acrylonitrile is preferably contained in an amount of 5 to 15 wt %, and allyl methacrylate is preferably contained in an amount of 0.1 to 10 wt %. Oil resistance, heat resistance, mechanical properties, and moldability possessed by the acrylic rubber can be exhibited in a well-balanced manner by setting the contents of these components in the above ranges.

Examples of the alkyl acrylate include methyl acrylate, ethyl acrylate, propyl acrylate, butyl acrylate, pentyl acrylate, hexyl acrylate, heptyl acrylate, 2-ethylhexyl acrylate, octyl acrylate, nonyl acrylate, decyl acrylate, and dodecyl acrylate. These monomers may be appropriately used individually or in a combination of two or more. Of these, methyl acrylate, ethyl acrylate, propyl acrylate, and butyl acrylate are particularly preferable.

In order to improve oil resistance and mechanical properties of the acrylic rubber, a secondary monomer, such as styrene, divinylbenzene, hydroxyethyl (meth)acrylate, hydroxypropyl (meth)acrylate, alkyl methacrylate having a $C_1$ to $C_{12}$ alkyl chain, bifunctional acrylate, bifunctional methacrylate, trifunctional acrylate, trifunctional methacrylate; α-olefin, such as ethylene, propylene, or isobutene; or conjugated diene, such as butadiene, isoprene, or chloroprene may be copolymerized with the monomer mixture which is a main component of the acrylic rubber. The percentage of the secondary monomer in the monomer mixture is preferably 40 wt % or less, and more preferably 30 wt % or less. If the percentage exceeds 40 wt %, the balance between oil resistance and mechanical properties in the acrylic rubber tends to be impaired.

Here, the monomer mixture may further comprise an active chlorine containing-monomer, an epoxy group-containing monomer, or a carboxyl group-containing monomer, as in the case of the vinyl copolymer.

A method for producing the acrylic rubber of the present invention will be specifically described in detail.

Monomer components comprising methoxyethyl acrylate, alkyl acrylate, acrylonitrile, and allyl methacrylate as main components are added dropwise to an aqueous solution containing a surfactant, water, and a polymerization initiator to carry out emulsion copolymerization. In this case, a part of the monomer components may be added in advance. After emulsion polymerization is completed, salting-out is carried out to obtain the acrylic rubber.

The temperature in the emulsion polymerization is preferably 40 to 100° C., and more preferably 60 to 90° C. The polymerization time is preferably 2 to 12 hours, and more preferably 4 to 10 hours.

There are no specific limitations to the surfactant. Any surfactant, such as anionic surfactants, nonionic surfactants, cationic surfactants, ampholytic surfactants, polymeric surfactants, or reactive emulsifiers can be used.

An anionic surfactant and a nonionic surfactant are preferable.

The surfactant may be used simply or in a mixture of two or more. The amount of the surfactant used is 0.1 to 25 parts by weight, preferably 0.5 to 20 parts by weight, with respect to 100 parts by weight of the total amount of all monomers. If the amount is less than 0.1 part by weight, emulsification tends to occur in an unstable manner to produce aggregates. If the amount exceeds 25 parts by weight, viscosity of the emulsion tends to increase too much.

There are no specific limitations to the polymerization initiator. Examples of the polymerization initiator include sodium persulfate, potassium persulfate, ammonium persulfate, acetyl peroxide, isobutyl peroxide, octanoyl peroxide, decanoyl peroxide, lauroyl peroxide, 3,3,5-trimethylhexanoyl peroxide, benzoyl peroxide, 2,4-dichlorobenzoyl peroxide, diisopropylperoxy dicarbonate, t-butylperoxymaleic acid, 2,2-azobis(isobutylonitrile), 2,2-azobis(2-methylbutylonitrile), 2-(carbamoylazo)isobutylonitrile, 2,2-azobis[2-(N-phenylamidino)propane]dihydrochloride, 2,2-azobis{2-[N-(4-hydroxyphenyl)amidino]propane}dihydrochloride, 2,2-azobis[2-(N-benzylamidino)propane]dihydrochloride, 2,2-azobis(2-amidinopropane) dihydrochloride, 2,2-azobis{2-[N-(2-hydroxyethyl)amidino]propane}dihydrochloride, 2,2-azobis[2-(2-imidazolin-2-yl)propane]dihydrochloride, 2,2-azobis[2-(4,5,6,7-tetrahydro-1H-1,3-diadipin-2-yl)propane]dihydrochloride, 2,2-azobis[2-(3,4,5,6-tetrahydropyrimidin-2-yl)propane]dihydrochloride, 2,2-azobis{2-[1-(2-hydroxyethyl)-2-imidazolin-2-yl]propane}dihydrochloride, 2,2-azobis[2-(2-imidazolin-2-yl)propane], 2,2-azobis[2-methyl-N-(2-hydroxyethyl)-propionamide], 2,2-azobis{2-methyl-N-[1,1-bis(hydroxymethyl)-2-hydroxyethyl]propionamide}, 4,4'-azobis(4-cyanovaleric acid), and 2,2-azobis[2-(hydroxymethyl)propionitrile].

The amount of the polymerization initiator used is preferably 0.05 to 10 parts by weight, and more preferably 0.1 to 5 parts by weight, with respect to 100 parts by weight of the total amount of all monomers. If the amount is less than 0.05 part by weight, polymerization initiation capability tends to decrease. If the amount exceeds 10 parts by weight, polymerization stability tends to decrease.

There are no specific limitations to the type of a salting-out agent used in the salting-out. Examples of the salting-out agent include polyvalent metal salts, such as calcium chloride, calcium nitrate, magnesium chloride, and aluminum sulfate; and organic acid amine salts, such as dimethylaminoacetate, ethylaminoacetate, and cyclohexylaminoacetate.

The mixing ratio of the graft copolymer to the acrylic rubber (graft copolymer/acrylic rubber, ratio by weight) is preferably 95/5 to 5/95, more preferably 90/10 to 10/90, and particularly preferably 85/15 to 15/85. The mixing ratio of the grafting precursor to the acrylic rubber (grafting precursor/acrylic rubber, ratio by weight) is preferably 95/5 to 5/95, more preferably 90/10 to 10/90, and particularly preferably 85/15 to 15/85. If the percentage of the acrylic rubber exceeds 95 wt %, moldability tends to decrease, and mechanical strength of a molding tends to decrease. If the percentage is less than 5 wt %, compression set of a molding tends to be inferior, and hardness tends to increase as well.

Next, the crosslinking agent of the present invention can be reacted with a crosslinkable functional group contained in the graft copolymer and the acrylic rubber, or a crosslinkable functional group contained in the grafting precursor and the acrylic rubber.

For example, when the crosslinkable functional group is active chlorine, epoxy group, carboxyl group, or an unsaturated group, a crosslinking agent having a functional group that can be reacted with this functional group is selected. Examples of the crosslinking agent are sulfur, a sulfur-containing organic compound, an amino group-containing compound, an acid anhydride group-containing compound, a carboxyl group-containing compound, an isocyanate group-containing compound, an epoxy group-containing compound, a resin crosslinking agent, and organic peroxides. This crosslinking agent is preferably used in combination with a conventional crosslinking agent.

Examples of the sulfur-containing organic compound include thiurams, such as tetramethylthiuram disulfide, tetraethylthiuram disulfide, tetrabutylthiuram disulfide, and dipentamethylenethiuram tetrasulfide; dithioic acid salts, such as sec-diethyl dithiocarbamate, t-diethyl dithiocarbamate, and sec-dimethyl dithiocarbamate; morpholine disulfide, and alkylphenol disulfide.

Examples of the amino group-containing compound include aliphatic diamines, such as trimethylhexamethylenediamine, ethylenediamine, and 1,4-diaminobutane; aliphatic polyamines, such as triethylenetetramine, pentaethylenehexamine, and aminoethylethanolamine; and aromatic amines, such as phenylenediamine, 4,4'-methylenedianiline, toluenediamine, and diaminoditolylsulfone.

Examples of the acid anhydride group-containing or carboxyl group-containing compound include trimellitic anhydride, pyromellitic anhydride, terephthalic acid, isophthalic acid, adipic acid, sebacic acid, and cyanuric acid.

Examples of the isocyanate-containing compound include isocyanates, such as toluene diisocyanate and an isocyanate group-terminated prepolymer.

Examples of the epoxy group-containing compound include epoxides, such as diglycidyl ether of bisphenol A, resorcinol, hydroquinone, or the like.

Examples of the resin crosslinking agent include an alkylphenol-formaldehyde resin, a melamine-formaldehyde condensate, a triazine-formaldehyde condensate, and a hexamethoxymethyl-melamine resin.

Examples of the organic peroxide include ketone peroxide, peroxyketal, hydroperoxide, dialkyl peroxide, diacyl peroxide, diacyl peroxide, peroxydicarbonate, and peroxyester. Of these, peroxyketal, dialkyl peroxide, and diacyl peroxide are preferable.

When the crosslinking site is an unsaturated group of non-conjugated diene or the like or does not contain a functional group, crosslinking by an organic peroxide is effective. As the organic peroxide used for crosslinking reaction, any conventional organic peroxide can be used without specific limitations.

Preferable such organic peroxides are di-t-butyl peroxide, t-butylcumyl peroxide, dicumyl peroxide, α,α'-bis(t-butylperoxydiisopropyl)benzene, 2,5-dimethyl-2,5-bis(t-butylperoxy)hexane, and 2,5-dimethyl-2,5-bis(t-butylperoxy)hexyne-3.

The amount of the crosslinking agent of the present invention added is preferably 0.01 to 10 wt %, and more preferably 0.01 to 5 wt %, with respect to the total amount of the graft copolymer and the acrylic rubber or the total amount of the grafting precursor and the acrylic rubber. This amount added is appropriately changed according to the concentration at the crosslinking point and the type of the crosslinking agent. If the amount is less than 0.01 wt %, oil resistance and mechanical properties of the olefinic thermoplastic elastomer tend to deteriorate. If the amount exceeds 10 wt %, moldability of the elastomer tends to decrease.

Next, the co-crosslinking agent will be described. The co-crosslinking agent is added in order to further improve oil resistance and mechanical properties of the thermoplastic elastomer. Examples of the co-crosslinking agent include p-benzoquinone dioxime, p,p-dibenzoylquinone dioxime, ethyleneglycol diacrylate, ethyleneglycol dimethacrylate, diethyleneglycol diacrylate, diethyleneglycol dimethacrylate, triethyleneglycol diacrylate, triethyleneglycol dimethacrylate, tetraethyleneglycol diacrylate, tetraethyleneglycol dimethacrylate, polyethyleneglycol diacrylate, polyethyleneglycol dimethacrylate, polyoxyethylene-modified bisphenol A diacrylate, polyoxyethylene-modified bisphenol A dimethacrylate, trimethylolpropane triacrylate, trimethylolpropane trimethacrylate, 1,6-hexanediol diacrylate, 1,6-hexanediol dimethacrylate, diallyl phthalate, tetraallyloxyethane, triallyl cyanulate, triallyl isocyanurate, triallyl phosphate, maleimide, phenylmaleimide, N,N'-m-phenylenebismaleimide, maleic anhydride, itaconic acid, divinylbenzene, vinyl toluene, and 1,2-polybutadiene.

Of these, p-benzoquinone dioxime, ethyleneglycol diacrylate, ethyleneglycol dimethacrylate, diethyleneglycol diacrylate, diethyleneglycol dimethacrylate, polyoxyethylene-modified bisphenol A diacrylate, polyoxyethylene-modified bisphenol A dimethacrylate, trimethylolpropane triacylate, trimethylolpropane trimethacrylate, 1,6-hexanediol diacrylate, 1,6-hexanediol dimethacrylate, diallyl phthalate, triallyl isocyanurate, triallyl phosphate, and divinylbenzene are preferable.

p-Benzoquinone dioxime, ethyleneglycol dimethacrylate, diethyleneglycol dimethacrylate, polyoxyethylene-modified bisphenol A diacrylate, polyoxyethylene-modified bisphenol A dimethacrylate, triallyl isocyanurate, triallyl phosphate, and divinylbenzene are more preferable.

The amount of the co-crosslinking agent used is 0.01 to 20 wt %, preferably 0.01 to 10 wt %, with respect to the total amount of the graft copolymer and the acrylic rubber or the total amount of the grafting precursor and the acrylic rubber. If the amount is less than 0.01 wt %, mechanical properties and oil resistance of the olefinic thermoplastic elastomer tend to deteriorate. If the amount exceeds 20 wt %, moldability of the elastomer tends to significantly decrease.

The olefinic thermoplastic elastomer and an additional olefin (co)polymer formed from the nonpolar α-olefin monomer may be melted and kneaded. Specific examples of the olefin (co)polymer include low-density polyethylene, very low-density polyethylene, ultralow-density polyethylene, low-molecular-weight polyethylene, polypropylene, and an ethylene-propylene (co) polymer.

Of these, polypropylene and an ethylene-propylene copolymer are preferable from the viewpoint of oil resistance and mechanical properties.

An oil-resistant ethylene-propylene copolymer is particularly preferable. The oil-resistant ethylene-propylene copolymer is homopolypropylene, an ethylene-propylene block copolymer with ethylene content of 10 wt % or less, or an ethylene-propylene random copolymer with ethylene content of 5 wt % or less.

The amount of the additional olefin (co)polymer added is preferably 90 wt % or less, and more preferably 80 wt % or less, particularly preferably 70 wt % or less, for the olefinic thermoplastic elastomer. If the amount exceeds 90 wt %, compression set of a molding undesirably decreases. A mixture of two or more such olefin (co)polymers may also be used.

At least one additive selected from the group consisting of a plasticizer, an extender, a lubricant, and an antioxidant may be added to the olefinic thermoplastic elastomer. The additive can improve performance of the olefinic thermoplastic elastomer according to the object of use. Further, an additive, such as a filler, flame retardant, colorant, antiscorching agent, coupling agent, or foaming agent may be optionally used.

Examples of the plasticizer used in the present invention include phthalates, such as dimethyl phthalate, di-2-ethylhexyl phthalate, dioctyl phthalate, and diisononyl phthalate; phosphates, such as tributyl phosphate and triphenyl phosphate; trimellitates; aliphatic dibasic acid esters, such as di-2-ethylhexyl adipate, diisodecyl adipate, dibutyldiglycol adipate, di-2-ethylhexyl azelate, dibutyl sebacate, and di-2-ethylhexyl sebacate; and sulfonamide.

Of these, phthalates, such as dimethyl phthalate, di-2-ethylhexyl phthalate, dioctyl phthalate, and diisononyl phthalate; and aliphatic dibasic acid esters, such as di-2-ethylhexyl adipate, diisodecyl adipate, dibutyldiglycol adipate, di-2-ethylhexyl azelate, dibutyl sebacate, and di-2-ethylhexyl sebacate are preferable.

Examples of the extender include (paraffin, naphthene, and aromatic) mineral oils.

Examples of the lubricant include silicone oil, olefin wax, condensation polymerization wax, fatty acid, fatty acid metal, fatty acid ester, fatty acid amide, and alkylene oxide derivatives.

As the antioxidant, one or more antioxidants including an essential phenol antioxidant are used. The phenol antioxidant may be used individually, but may be used in combination with another antioxidant. Examples of the antioxidant that can be used in combination with the phenol antioxidant include a phosphorus antioxidant, sulfur antioxidant, and amine antioxidant.

Examples of the phenol antioxidant include monophenol antioxidants, such as 2,6-di-t-butyl-4-methylphenol, 2,6-di-t-butyl-4-ethylphenol, 2-t-butyl-4-methoxyphenol, 3-t-butyl-4-methoxyphenol, and n-octadecyl-3-(3,5-di-t-butyl-4-hydroxyphenyl) propionate; bisphenol antioxidants, such as 2,2'-methylenebis(4-methyl-6-t-butylphenol), 2,2'-methylenebis(4-ethyl-6-t-butylphenol), 4,4'-thiobis(3-methyl-6-t- butylphenol), 4,4'-butylidenebis(3-methyl-6-t-butylphenol), and 3,9-bis[1,1-dimethyl-2-[β-(3-t-butyl-4-hydroxy-5-methylphenyl)propionyloxy]ethyl]2,4,8,10-tetraoxaspiro[5.5]undecane; and polyphenol antioxidants, such as 1,1,3-tris(2-methyl-4-hydroxy-5'-t-butylphenyl)butane, 1,3,5-trimethyl-2,4,6-tris(3,5-di-t-butyl-4-hydroxybenzyl)benzene, tetrakis-[methylene-3-(3',5-di-t-butyl-4'-hydroxyphenyl)propionate]methane, bis[3,3'-bis-(4'-hydroxy-3'-t-butylphenyl)butyric acid]glycol ester, 1,3,5-tris(3',5'-di-t-butyl-4'-hydroxybenzyl)-sec-triazine-2,4,6-(1H,3H,5H)trione, and D-α-tocophenol.

Examples of the phosphorus antioxidant include triphenyl phosphite, diphenyl isodecyl phosphite, 4,4'-butylidene-bis (3-methyl-6-t-butylphenyl ditridecyl) phosphite, octadecyl phosphite, tris(nonyl phenyl) phosphite, diisodecyl pentaerythritol diphosphite, 9,10-dihydro-9-oxa-10-phosphaphenanthrene-10-oxide, 10-(3,5-di-t-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-t-butylphenyl) phosphite, bis(2,4-di-t-butylphenyl)pentaerythritol-di-phosphite, bis(2,6-di-t-butyl-4-methylphenyl)pentaerythritol-di-phosphite, and 2,2'-methylenebis(4,6-di-t-butylphenyl)octyl phosphite.

Examples of the sulfur antioxidant include dilauryl 3,3-thiodipropionate, dimyristyl 3,3'-thiodipropionate, distearyl 3,3'-thiodipropionate, pentaerythritol tetrakis(3-laurylthiopropionate), and 2-mercaptobenzimidazole.

Examples of the amine antioxidant include alkyl-substituted diphenylamine.

Two or more such antioxidants may be used in combination if the antioxidants include at least one phenol antioxidant.

Examples of the filler include carbon black, white carbon, clay, mica, calcium carbonate, and talc.

Examples of the flame retardant include inorganic flame retardants represented by magnesium hydroxide, aluminum hydroxide, and the like, and organic flame retardants represented by a halogen flame retardant, a phosphorus flame retardant, and the like.

Examples of the antiscorching agent include a sulfonamide derivative, diphenylurea, and N-(cyclohexylthio)phthalimide.

The additive may be added in an amount of preferably 200 wt % or less, and more preferably 150 wt % or less, to the olefinic thermoplastic elastomer of the present invention. If the amount added exceeds 200 wt %, mechanical properties of a molding undesirably decrease.

Without departing from the scope of the present invention, other thermoplastic resins or rubbers may be added to the olefinic thermoplastic elastomer.

Examples of the other thermoplastic resins or rubbers include engineering plastics, such as a polyamide resin, polyester resin, polyacetal resin, polycarbonate resin, polyphenylene ether resin, and polyallylate resin; olefin resins, such as an ethylene-ethyl acrylate copolymer and an ethylene-glycidyl methacrylate copolymer; styrene resins, such as polystyrene resin, high-impact polystyrene resin, and an acrylonitrile butadiene styrene resin; general-purpose plastics, such as an acrylic resin and a vinyl chloride resin; thermoplastic elastomers, such as an ester thermoplastic elastomer, styrene thermoplastic elastomer, olefinic thermoplastic elastomer, urethane thermoplastic elastomer, amide thermoplastic elastomer, and polybutadiene thermoplastic elastomer; synthetic rubbers, such as butadiene rubber, butadiene-styrene rubber, butadiene-acrylonitrile rubber, chloroprene rubber, hydrin rubber, butyl rubber, ethylene-propylene copolymer rubber, urethane rubber, silicon rubber, fluorine rubber, silicone rubber, and acrylic rubber; and natural rubber.

In order to improve oil resistance of the olefinic thermoplastic elastomer, butadiene-acrylonitrile rubber, chloroprene rubber, hydrin rubber, urethane rubber, fluorine rubber, acrylic rubber, and the like are preferable. In order to improve low-temperature characteristics and mechanical properties of the olefinic thermoplastic elastomer, thermoplastic elastomers, such as an ester thermoplastic elastomer, styrene thermoplastic elastomer, olefinic thermoplastic elastomer, urethane thermoplastic elastomer, amide thermoplastic elastomer, and polybutadiene thermoplastic elastomer; butadiene rubber, butyl rubber, ethylene-propylene copolymer rubber, silicone rubber, and the like are preferable.

A method for subjecting the olefinic thermoplastic elastomer to melting and mixing can be carried out by a conventionally used kneader, such as Banbury mixer, pressure kneader, kneading extruder, biaxial extruder, or roll.

The kneading temperature is in the range of preferably 100 to 300° C., and more preferably 120 to 280° C. If the temperature is less than 100° C., melting is inadequate, or mixing is insufficient due to high melt viscosity, whereby phase separation or delamination undesirably occurs in a molding. If the temperature exceeds 300° C., the resin subjected to mixing undesirably easily decomposes or gelates.

The olefinic thermoplastic elastomer can be molded by any molding method, such as injection molding, extrusion, vacuum molding, or blow molding. Injection molding is preferable from the viewpoint of flowability and appearance of a molding. When forming a sheet, extrusion is preferable from the viewpoint of moldability and appearance. Vacuum molding is more preferable from the viewpoint of deep-drawing moldability. The molding has excellent recycling characteristics in that the product after use can be recovered and used again as a raw material for molding.

A hose obtained by molding the olefinic thermoplastic elastomer of the present invention can be obtained by molding by extrusion using a conventional extruder. The elastomer can also be molded as a molding in the shape of a hose having a reinforcing layer, by using an apparatus that can continuously feed various fibers for reinforcement.

Since the hose of the present invention exhibits excellent oil resistance, heat resistance, and moldability, the hose can be used not only as a material for the outer layer or middle layer of a hose, but also as a material for the innermost layer of a hose that comes in contact with fluid and is used under severe conditions. Examples of the hose include hoses for automobiles, such as a filler hose, evaporation hose, fuel hose, vapor emission hose, in-tank fuel hose, power-steering hose, air-conditioning hose, radiator hose, heater hose, transmission oil cooler hose, engine oil cooler hose, brake hose, turbocharger drain hose, fuel injection hose, air-conditioning hose, air duct hose, air intake hose, vacuum control hose, vacuum-sensing hose, and air pollution control hose; various hoses for industrial machinery, such as a hose for hydraulic equipment, a hose for pneumatic machinery, a hose for centralized lubrication equipment, a hose for coating equipment, a hose for chemical plants, a hose for transporting solvents or chemicals, a hose for transporting various liquefied gases, a hose for food-related equipment, a hose for physical and chemical equipment, a hose for spinning machinery, a hose for packing machinery, a hose for printing machinery, a hose for conducting machinery, a hose for water treatment units, a hose for fluid control devices, a hose for industrial robots, a hose for industrial vehicles, a hose for agricultural machinery, a hose for construction machinery, a hose for machine tools, a hose for injection molding machines, a hose for labor-saving machinery, a hose for spot-welding equipment, a steam hose, an agricultural spray hose, a brewing hose, a diving hose, a handless oil hose, a gas-tubing hose, an air brake hose, a petrol station hose, a tanker hose, a rotary hose, a fire extinguisher hose, a hose in operating sections, a hose for pneumatic and electric signals, a hose for pneumatic signals, and a hose for equipment requiring heat resistance, high insulation, and high-frequency characteristics; hoses for air tools, such as an air driver and air hammer; and medical hoses.

The olefinic thermoplastic elastomer of the present invention is useful as a material for a seal for automobiles or vehicles, electric or electronic machinery, industrial products, and building products. The shape, thickness, dimension, and the like of the seal is appropriately selected according to the object of use. For example, the elastomer is molded in the shape of H, Y, U, O, sheet, tape, block, disk, line, cylinder, prism, or hollow body. The seal is used as a crankshaft seal, a piston seal, a rod seal, a dust seal, a bearing seal, a valve seal, a slide seal, a seal for component junction sections, a pipe packing, an inner lid for vessels, a packing for vessel caps, a plug for vessels, an O-ring, an X-ring, an U-packing, a V-packing, an oil pan gasket, or a cylinder gasket, for example.

The present invention has the following advantages.

The olefinic thermoplastic elastomer comprises acrylic rubber and a graft copolymer. The graft copolymer is composed of an olefin (co)polymer segment and a vinyl polymer segment, with particles of one segment being dispersed in the other segment. Since methoxyethyl acrylate provides the acrylic rubber with polarity, compatibility between the vinyl polymer segment in the graft copolymer and the acrylic rubber is high, and the graft copolymer is well dispersed in the matrix phase (continuous phase) of the acrylic rubber. Since the acrylic rubber and the olefin polymer in the graft copolymer sufficiently exhibit oil resistance and mechanical properties, an olefinic thermoplastic elastomer with improved oil resistance and mechanical properties can be obtained.

Further, when a crosslinkable functional group is introduced into the graft copolymer, a grafting precursor, or the acrylic rubber, the elastomer is efficiently crosslinked by a crosslinking agent or co-crosslinking agent. Accordingly, the olefinic thermoplastic elastomer has high crosslinking density and improved oil resistance and mechanical properties.

The above embodiment will be more specifically described below with reference to examples and comparative examples. However, the present invention is not limited thereto.

Reference Example 1

Preparation of Acrylic Rubber (A)

A flask equipped with a stirrer, a thermometer, a cooler, a dropping unit, and a nitrogen gas inlet pipe was charged with 2,300 g of deionized water and 20 g of sodium dodecylsulfate, and then heated to 70° C. while bubbling nitrogen gas with stirring. Next, 5 g of potassium persulfate was added as a polymerization initiator. 1,608 g of a monomer mixture (methoxyethyl acrylate: 320 g, ethyl acrylate: 1,200 g, acrylonitrile: 80 g, allyl methacrylate: 8 g) was added dropwise thereto over three hours while maintaining the temperature at 70° C. Polymerization was then carried out for further three hours to obtain emulsion. The emulsion in this state had average particle diameter of 90 nm determined by dynamic light scattering (DLS).

Next, this emulsion was added dropwise to 1% aqueous solution of calcium chloride having the same weight over one hour to carry out salting-out. After washing with water, the mixture was dried at 70° C. to obtain acrylic rubber (A). The amounts of the components used are shown in Table 1.

Reference Example 2

Preparation of Acrylic Rubber (B)

Acrylic rubber (B) was obtained according to Reference Example 1, except that 480 g of methoxyethyl acrylate, 480 g of ethyl acrylate, 480 g of butyl acrylate, 160 g of acrylonitrile, and 8 g of allyl methacrylate were used as the monomer mixture in stead of that used in Reference Example 1. The amounts of the components used are shown in Table 1.

Reference Example 3

Preparation of Acrylic Rubber (C)

Acrylic rubber (C) was obtained according to Reference Example 1, except that 1,440 g of ethyl acrylate, 160 g of acrylonitrile, and 8 g of allyl methacrylate were used as the monomer mixture in stead of that used in Reference Example 1. The amounts of the components used are shown in Table 1.

Reference Example 4

Preparation of Acrylic Rubber (D)

Acrylic rubber (D) was obtained according to Reference Example 1, except that 320 g of methoxyethyl acrylate, 1,200 g of ethyl acrylate, and 80 g of acrylonitrile were used as the monomer mixture in stead of that used in Reference Example 1. The amounts of the components used are shown in Table 1.

TABLE 1

| | Reference Examples | | | |
| --- | --- | --- | --- | --- |
| | 1 | 2 | 3 | 4 |
| acryl rubber | A | B | C | D |
| methoxy ethyl acrylate | 320 | 480 | — | 320 |
| ethyl acrylate | 1200 | 480 | 1440 | 1200 |
| butyl acrylate | — | 480 | — | — |
| acrylonitrile | 80 | 160 | 160 | 80 |
| allyl methacrylate | 8 | 8 | 8 | — |

Reference Example 5

Preparation of Grafting Precursor (a)

An autoclave with a volume of 5 l made of stainless steel was charged with 2,000 g of pure water. Further, 2.5 g of polyvinyl alcohol as a suspending agent was dissolved therein. 700 g of polypropylene A (block copolymer, particle diameter: 3 mm, ethylene content: 5.9 wt %) was put therein and dispersed by stirring. A monomer mixture composed of 1.2 g of benzoyl peroxide (radical polymerization initiator manufactured by NOF Corporation, trade name: Nyper B), 6 g of t-butylperoxymethacryloyloxyethyl carbonate (radically polymerizable organic peroxide), and 300 g of a vinyl monomer mixture was put therein, followed by stirring. The vinyl monomer mixture was composed of 100 g of styrene, 100 g of butyl acrylate, and 100 g of hydroxypropyl methacrylate.

Next, the autoclave was heated to 60 to 65° C., and stirring was carried out for two hours so that the radical polymerization initiator, radically polymerizable organic peroxide, and vinyl monomers were immersed in the polypropylene. Next, polymerization was completed by raising the temperature to 80 to 85° C. and maintaining the raised temperature for six hours. The polymer was then washed and dried to obtain a grafting precursor (a). The vinyl copolymer in the grafting precursor (a) was extracted with toluene. GPC determined that the copolymer had number average degree of polymerization of 850.

An observation by a scanning electron microscope (manufactured by JEOL Ltd., JEOL JSM T300) confirmed that the grafting precursor (a) had a polyphase structure in which resin spheres with a particle diameter of 0.3 to 0.5 μm were uniformly dispersed. The amounts of the components used are shown in Table 2.

TABLE 2

| | | Reference Examples | | | |
|---|---|---|---|---|---|
| | | 5 | 6 | 7 | 8 |
| Ingredients | grafting precursor | a | b | c | d |
| | polypropylene A | 700 | 700 | — | — |
| | polypropylene B | — | — | 700 | — |
| | polypropylene C | — | — | — | 700 |
| | styrene | 100 | 100 | 100 | 100 |
| | butyl acrylate | 100 | 100 | 100 | 100 |
| | hydroxypropyl methacrylate | 100 | — | 100 | — |
| | methoxyethyl acrylate | — | 100 | — | 100 |
| | allyl methacrylate | — | 3 | — | — |
| | benzoyl peroxide (Nyper B) | 1.2 | 2.4 | 1.2 | 2.4 |
| | t-butylperoxymethacryloyloxyethyl carbonate | 6 | 6 | 6 | 9 |

Reference Example 6

Preparation of Grafting Precursor (b)

A grafting precursor (b) was obtained according to Reference Example 5, except that the amount of benzoyl peroxide added was changed from 1.2 g to 2.4 g, and 303 g of a vinyl monomer mixture (styrene: 100 g, butyl acrylate: 100 g, methoxyethyl acrylate: 100 g, allyl methacrylate: 3 g (monomer having a crosslinkable functional group)) was used. In this case, the vinyl copolymer in the grafting precursor (b) had number average degree of polymerization of 600. The resin dispersed in the grafting precursor (b) had average particle diameter of 0.3 to 0.5 μm.

Reference Example 7

Preparation of Grafting Precursor (c)

A grafting precursor (c) was obtained according to Reference Example 5, except that 700 g of polypropylene B (random copolymer, particle diameter: 3 mm, ethylene content: 5.6 wt %) was used in place of polypropylene A in Reference Example 5. In this case, the vinyl copolymer in the grafting precursor (c) had number average degree of polymerization of 900. The resin dispersed in the grafting precursor (c) had average particle diameter of 0.3 to 0.5 μm.

Reference Example 8

Preparation of Grafting Precursor (d)

A grafting precursor (d) was obtained according to Reference Example 5, except that 700 g of polypropylene C (random copolymer, particle diameter: 3 mm, ethylene content: 4.0 wt %) was used in place of polypropylene A, the amount of benzoyl peroxide added was changed from 1.2 g to 2.4 g, the amount of t-butylperoxymethacryloyloxyethyl carbonate added was changed from 6 g to 9 g, and 100 g of styrene, 100 g of butyl acrylate, and 100 g of methoxyethyl acrylate (300 g in total), were used as the vinyl monomer mixture in stead of that used in Reference Example 5. In this case, the vinyl copolymer in the grafting precursor (d) had number average degree of polymerization of 650. The resin dispersed in the grafting precursor (d) had average particle diameter of 0.3 to 0.5 μm.

Example 1

600 g of the grafting precursor (a) obtained in Reference Example 5 and 1,800 g of the acrylic rubber (A) obtained in Reference Example 1 were kneaded using a pressure kneader (manufactured by Moriyama Company Ltd., volume: 3 l) heated in advance to 190° C. for ten minutes. Then, 15 g of 2,5-dimethyl-2,5-bis(t-butylperoxy)hexane (manufactured by NOF Corporation, trade name: Perhexa 25B, hereinafter abbreviated to Perhexa 25B) as a crosslinking agent and 30 g of polyoxyethylene-modified bisphenol A dimethacrylate (manufactured by Shin-Nakamura Chemical Co., Ltd., trade name: BPE-200, hereinafter abbreviated to BPE-200) as a co-crosslinking agent were added. Further, kneading was carried out at that temperature for five minutes to obtain an olefinic thermoplastic elastomer. The olefinic thermoplastic elastomer was fed into a biaxial uniaxial extruder (biaxially kneading and uniaxially extruding) set at a cylinder temperature of 180° C., extruded, and then granulated. The resin granules were molded by pressing to prepare a sheet (190° C., 35 MPa/cm$^2$). The sheet was punched out to prepare a test specimen (dumbbell No. 3). Properties of the test specimen were determined by the following test methods. The results are shown in Table 3.

The test methods were carried out in the following manner.

Hardness Test

Hardness (Shore A, ShA) was determined using a type-A durometer tester according to JIS K-6253.

Tension Test

The tension test was carried out using the dumbbell No. 3 test specimen according to JIS K-6251 to determine tensile strength (MPa) and fracture elongation (%)

Compression Set Test

Compression set (%) at 120° C. after 22 hours was determined according to JIS K-6262.

Oil Resistance Test

After immersing the test specimen (dumbbell No. 3) in oil for the test (IRM903 oil) at 120° C. for 72 hours, the weight after immersing and the weight before immersing were determined to calculate the degree of swelling in accordance with the following formula:

Degree of swelling (%)={(weight after immersing−weight before immersing)/weight before immersing}×100

Appearance Test

Flow marks, surface roughness, silver streaks (streaks by the influence of moisture or the like), and blooming (surface irregularity due to bleed-out), and the like on the surface of the injection-molding were visually assessed and evaluated as good, fair, or bad as follows:

◎: The molding had excellent appearance.
○: Appearance of the molding was not good enough, but was acceptable.
X: Appearance of the molding was not acceptable.

Melt Flow Rate (MFR) Test

MFR (g/10 min) was determined at 190° C. with a load of 10.0 kg according to JIS K-7210.

170° C., extruded, and then granulated. The same tests were carried out. The results are shown in Table 3.

Example 4

All the same tests as in Example 3 were carried out, except that 500 g of the grafting precursor (a) obtained in Reference Example 5 was used in place of 500 g of the grafting precursor (c). The results are shown in Table 3.

TABLE 3

| | | Examples | | | | | | | | |
|---|---|---|---|---|---|---|---|---|---|---|
| | | 1 | 2 | 3 | 4 | 5 | 6 | 7 | 8 | 9 |
| Ingredients | acryl rubber A | 1800 | 1800 | 1750 | 1750 | — | 1650 | 1750 | — | — |
| | acryl rubber B | — | — | — | — | 1800 | — | — | 1750 | 1650 |
| | precursor a | 600 | — | — | 500 | — | 550 | 500 | 500 | — |
| | precursor b | — | — | — | — | 450 | — | — | — | — |
| | precursor c | — | — | 500 | — | — | — | — | — | — |
| | precursor d | — | — | — | — | — | — | — | — | 550 |
| | graft copolymer | — | 600 | — | — | — | — | — | — | — |
| | Perhexa 25B | 15 | 15 | 10 | 10 | 20 | — | 15 | 15 | — |
| | Perbutyl P | — | — | — | — | — | 15 | — | — | 10 |
| | triallyl phosphate | — | — | 15 | 15 | — | — | — | — | — |
| | BPE-200 | 30 | 30 | — | — | 60 | — | 100 | 90 | — |
| | ethyleneglycol dimethacrylate | — | — | — | — | — | 30 | — | — | 50 |
| | dioctyl phthalate | — | — | — | — | 600 | — | 500 | 600 | — |
| | dibutyldiglycol adipate | — | — | — | — | — | 400 | — | — | 800 |
| | polypropylene E | — | — | — | — | — | 200 | — | 300 | 350 |
| | polypropylene F | — | — | — | — | — | — | 200 | — | — |
| | Irganox 1010 | — | — | 20 | 20 | 20 | 30 | 15 | 20 | 10 |
| Properties | hardness(ShA) | 80 | 80 | 80 | 79 | 67 | 75 | 72 | 75 | 70 |
| | tensile strength(MPa) | 6.2 | 5.5 | 8.0 | 7.5 | 4.5 | 5.5 | 5.2 | 6.2 | 5.0 |
| | fracture elongation(%) | 300 | 280 | 320 | 300 | 230 | 280 | 260 | 300 | 240 |
| | compression set(%) | 45 | 48 | 50 | 49 | 35 | 43 | 43 | 40 | 37 |
| | oil resistance (weight change(%)) | 12 | 14 | 15 | 10 | 0 | 4 | 2 | 0 | 0 |
| | heat resistance (fracture elongation (%)) | 200 | 180 | 320 | 310 | 210 | 270 | 280 | 300 | 250 |
| | appearance | ○ | ○ | ◎ | ◎ | ◎ | ◎ | ◎ | ◎ | ◎ |
| | MFR(g/10 min) | 35 | 40 | 20 | 20 | 15 | 20 | 20 | 25 | 35 |

Example 2

All the same tests as in Example 1 were carried out, except that, a graft copolymer obtained by extruding the grafting precursor (a) obtained in Reference Example 5 using Labo Plastomill uniaxial extruder (manufactured by Toyo Seiki Seisaku-sho, Ltd.) at 180° C. to carry out grafting reaction was used in place of the grafting precursor (a) obtained in Reference Example 5. The results are shown in Table 3.

Example 3

500 g of the grafting precursor (c) obtained in Reference Example 7 and 1,750 g of the acrylic rubber (A) obtained in Reference Example 1 were kneaded using a pressure kneader (manufactured by Moriyama Company Ltd., volume: 3 l) heated in advance to 190° C. for ten minutes. Then, 10 g of Perhexa 25B as a crosslinking agent, 15 g of triallyl phosphate as a co-crosslinking agent, and 20 g of a phenol antioxidant (trade name: Irganox 1010, manufactured by Ciba Specialty Chemicals Inc., hereinafter abbreviated to Irganox 1010) were added. Further, kneading was carried out at that temperature for five minutes to obtain an olefinic thermoplastic elastomer. The olefinic thermoplastic elastomer was fed into a biaxial uniaxial extruder set at a cylinder temperature of

Example 5

1,800 g of the acrylic rubber (B) obtained in Reference Example 2, 20 g of a crosslinking agent (Perhexa 25B), 60 g of BPE-200 as a co-crosslinking agent, 600 g of dioctyl phthalate as a plasticizer, and 20 g of a phenol antioxidant (Irganox 1010) were added to 450 g of the grafting precursor (b) obtained in Reference Example 6. These were kneaded using a pressure kneader heated in advance to 200° C. for 20 minutes to obtain an olefinic thermoplastic elastomer. The olefinic thermoplastic elastomer was extruded and then granulated under the same conditions as in Example 3. The same tests were carried out. The results are shown in Table 3.

Example 6

1,650 g of the acrylic rubber (A) obtained in Reference Example 1, 400 g of dibutyldiglycol adipate as a plasticizer, 200 g of polypropylene E (block copolymer, ethylene content: 8 wt %), and 30 g of a phenol antioxidant (Irganox 1010) were added to 550 g of the grafting precursor (a) obtained in Reference Example 5. These were kneaded using a pressure kneader heated in advance to 190° C. for 10 minutes. Then, 15 g of α,α'-bis(t-butylperoxydiisopropyl)benzene (manufactured by NOF Corporation, trade name: Perbutyl P, hereinafter abbreviated to Perbutyl P) as a crosslinking agent and 30 g of ethyleneglycol dimethacrylate as a co-crosslinking agent were added. Further, kneading was carried out at the same temperature for five minutes to obtain an olefinic thermoplastic elastomer. The olefinic thermoplastic elastomer was extruded and then granulated under the same conditions as in Example 3, except that the cylinder temperature was changed to 180° C. The same tests were carried out. The results are shown in Table 3.

Example 7

1,750 g of the acrylic rubber (A) obtained in Reference Example 1, 100 g of BPE-200 as a co-crosslinking agent, 500 g of dioctyl phthalate as a plasticizer, and 15 g of a phenol antioxidant (Irganox 1010) were added to 500 g of the grafting precursor (a) obtained in Reference Example 5. These were kneaded using a pressure kneader heated in advance to 180° C. for 10 minutes. Then, 15 g of Peroxa 25B as a crosslinking agent and 200 g of polypropylene F (homopolypropylene) were added. Further, kneading was carried out at the same temperature for five minutes to obtain an olefinic thermoplastic elastomer. The olefinic thermoplastic elastomer was extruded and then granulated under the same conditions as in Example 3. The same tests were carried out. The results are shown in Table 3.

Example 8

1,750 g of the acrylic rubber (B) obtained in Reference Example 2, 90 g of BPE-200 as a co-crosslinking agent, 600 g of dioctyl phthalate as a plasticizer, 300 g of polypropylene E (block copolymer, ethylene content: 8 wt %), and 20 g of a phenol antioxidant (Irganox 1010) were added to 500 g of the grafting precursor (a) obtained in Reference Example 5. These were kneaded using a pressure kneader heated in advance to 190° C. for 10 minutes. Then, 15 g of a crosslinking agent (Peroxa 25B) was added. Further, kneading was carried out at the same temperature for five minutes to obtain an olefinic thermoplastic elastomer. The olefinic thermoplastic elastomer was extruded and then granulated under the same conditions as in Example 3. The same tests were carried out. The results are shown in Table 3.

Example 9

1,650 g of the acrylic rubber (B) obtained in Reference Example 2, 800 g of dibutyldiglycol adipate as a plasticizer, and 350 g of polypropylene E (block copolymer, ethylene content: 8 wt %) were added to 550 g of the grafting precursor (d) obtained in Reference Example 8. These were kneaded using a pressure kneader heated in advance to 190° C. for 10 minutes. Then, 10 g of a crosslinking agent (Perbutyl P), 50 g of ethyleneglycol dimethacrylate as a co-crosslinking agent, and 10 g of a phenol antioxidant (Irganox 1010) were added. Further, kneading was carried out at the same temperature for five minutes to obtain an olefinic thermoplastic elastomer. The olefinic thermoplastic elastomer was extruded and then granulated under the same conditions as in Example 3. The same tests were carried out. The results are shown in Table 3.

Comparative Example 1

The same operation as in Example 3 was carried out, except that a crosslinking agent and a co-crosslinking agent were not used. The test results are shown in Table 4.

Comparative Example 2

The same operation as in Example 5 was carried out, except that a co-crosslinking agent was not used. The test results are shown in Table 4.

Comparative Example 3

The same operation as in Example 6 was carried out, except that 1,650 g of the acrylic rubber (C) obtained in Reference Example 3 was used in place of 1,650 g of the acrylic rubber (A). The test results are shown in Table 4.

Comparative Example 4

The same operation as in Example 6 was carried out, except that 1,650 g of the acrylic rubber (D) obtained in Reference Example 4 was used in place of 1,650 g of the acrylic rubber (A). The test results are shown in Table 4.

As is clear from Tables 3 and 4, the olefinic thermoplastic elastomers of Examples 1 to 9 exhibited excellent oil resistance, as well as excellent performance in mechanical properties, such as tensile strength, fracture elongation, and compression set, moldability, and appearance, and had particularly improved oil resistance, tensile strength, and compression set due to addition of a crosslinking agent or a co-crosslinking agent. Further, it became clear that oil resistance was remarkably improved by using an ethylene-propylene random copolymer with ethylene content of 5 wt % or less or an ethylene-propylene block copolymer with ethylene content of 10 wt % or less as an olefin polymer formed from a nonpolar α-olefin monomer.

In contrast, it was confirmed that the series in which a crosslinking agent or a co-crosslinking agent was not added (Comparative Examples 1 and 2) or the series in which acrylic rubber not containing methoxyethyl acrylate or allyl methacrylate was used (Comparative Examples 3 and 4) exhibited decreased mechanical properties and oil resistance.

TABLE 4

|  |  | Comparative Examples | | | |
|---|---|---|---|---|---|
|  |  | 1 | 2 | 3 | 4 |
| Ingredients | acryl rubber A | 1750 | — | — | — |
|  | acryl rubber B | — | 1800 | — | — |
|  | acryl rubber C | — | — | 1650 | — |
|  | acryl rubber D | — | — | — | 1650 |
|  | grafting precursor a | — | — | 550 | 550 |
|  | grafting precursor b | — | 450 | — | — |
|  | grafting precursor c | 500 | — | — | — |
|  | Perhexa 25B | — | 20 | — | — |
|  | Perbutyl P | — | — | 15 | 15 |
|  | ethyleneglycol dimethacrylate | — | — | 30 | 30 |
|  | dioctyl phthalate | — | 600 | — | — |
|  | dibutyldiglycol adipate | — | — | 400 | 400 |
|  | polypropylene E | — | — | 200 | 200 |
|  | Irganox 1010 | 20 | 20 | 30 | 30 |
| Properties | hardness (ShA) | 77 | 65 | 78 | 70 |
|  | tensile strength (MPa) | 5.0 | 3.5 | 5.7 | 4.0 |
|  | fracture elongation (%) | 220 | 190 | 300 | 220 |
|  | compression set (%) | 65 | 50 | 52 | 60 |
|  | oil resistance (weight change (%)) | 30 | 12 | 10 | 15 |
|  | heat resistance (fracture elongation (%)) | 200 | 180 | 270 | 210 |

TABLE 4-continued

| | Comparative Examples | | | |
|---|---|---|---|---|
| | 1 | 2 | 3 | 4 |
| appearance | ○ | ○ | ◉ | ○ |
| MFR (g/10 min) | 70 | 40 | 25 | 60 |

The invention claimed is:

1. An olefinic thermoplastic elastomer obtained by melting and kneading ingredients, the ingredients including:
   a graft copolymer composed of an olefin co-polymer segment formed from a nonpolar α-olefin monomer, and a vinyl polymer segment formed from vinyl monomers, the vinyl monomers including at least styrene and butyl acrylate, wherein the graft copolymer has a polyphase structure in which one of the olefin co-polymer segment and the vinyl polymer segment form a dispersed phase in the other with a particle size of 0.01 to 1 μm, wherein the olefin co-polymer segment is an ethylene-propylene block copolymer with ethylene content of 10 wt % or less;
   an acrylic rubber formed from a monomer mixture in which 10 to 90 wt % of methoxyethyl acrylate, 5 to 85 wt % of alkyl acrylate, 5 to 15 wt % of acrylonitrile, and 0.1 to 10 wt % of allyl methacrylate are contained as main ingredients;
   0.01 to 10 wt % of a crosslinking agent with respect to the total amount of the graft copolymer and the acrylic rubber; and
   0.01 to 10 wt % of a co-crosslinking agent with respect to the total amount of the graft copolymer and the acrylic rubber.

2. The olefinic thermoplastic elastomer according to claim 1, wherein the vinyl polymer segment has a crosslinkable functional group.

3. The olefinic thermoplastic elastomer according to claim 1, wherein the ratio by weight of the graft copolymer to the acrylic rubber is 95:5 to 5:95.

4. The olefinic thermoplastic elastomer according to claim 1, the ingredients further including an olefin polymer or olefin copolymer formed from a nonpolar α-olefin monomer.

5. The olefinic thermoplastic elastomer according to claim 4, wherein the olefin polymer or olefin copolymer formed from a nonpolar α-olefin monomer is an oil-resistant ethylene-propylene copolymer.

6. The olefinic thermoplastic elastomer according to claim 1, the ingredients further including at least one additive selected from the group consisting of a plasticizer, an extender, a lubricant, and an antioxidant.

7. The olefinic thermoplastic elastomer according to claim 1, the ingredients further including at least one of other thermoplastic resins or rubbers.

8. An olefinic thermoplastic elastomer obtained by melting and kneading ingredients, the ingredients including:
   a grafting precursor composed of particles of an olefin co-polymer formed from a nonpolar α-olefin monomer, and a copolymer of vinyl monomers and a radically polymerizable organic peroxide, the copolymer being dispersed in the particles, the vinyl monomers including at least styrene and butyl acrylate, wherein the olefin co-polymer segment is an ethylene-propylene block copolymer with ethylene content of 10 wt % or less;
   an acrylic rubber formed from a monomer mixture in which 10 to 90 wt % of methoxyethyl acrylate, 5 to 85 wt % of alkyl acrylate, 5 to 15 wt % of acrylonitrile, and 0.1 to 10 wt % of allyl methacrylate are contained as main components;
   0.01 to 10 wt % of a crosslinking agent with respect to the total amount of the grafting precursor and the acrylic rubber; and
   0.01 to 10 wt % of a co-crosslinking agent with respect to the total amount of the grafting precursor and the acrylic rubber.

9. The olefinic thermoplastic elastomer according to claim 8, wherein the grafting precursor is obtained by immersing the vinyl monomers, the radically polymerizable organic peroxide, and a radical polymerization initiator in the particles of the polymer and copolymerizing the vinyl monomers and the radically polymerizable organic peroxide.

10. The olefinic thermoplastic elastomer according to claim 8, wherein the radically polymerizable organic peroxide is a compound represented by the formula (1) or (2):

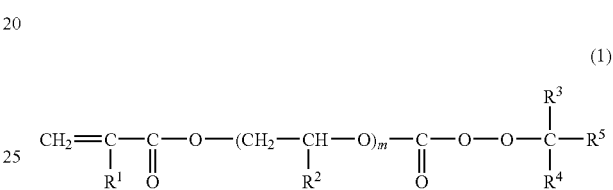

wherein $R^1$ represents hydrogen atom or a $C_1$ to $C_2$ alkyl group, $R^2$ represents hydrogen atom or methyl group, $R^3$ and $R^4$ independently represent a $C_1$ to $C_4$ alkyl group, $R^5$ represents a $C_1$ to $C_{12}$ alkyl group, a phenyl group, an alkyl-substituted phenyl group, or a $C_3$ to $C_{12}$ cycloalkyl group, and m is an integer of 1 or 2; and

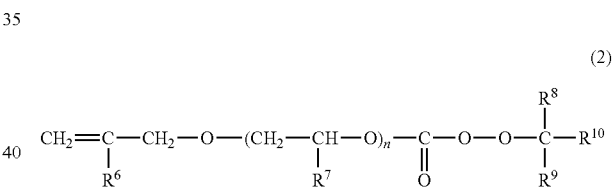

wherein $R^6$ represents hydrogen atom or a $C_1$ to $C_4$ alkyl group, $R^7$ represents hydrogen atom or methyl group, $R^8$ and $R^9$ independently represent a $C_1$ to $C_4$ alkyl group, $R^{10}$ represents a $C_1$ to $C_{12}$ alkyl group, a phenyl group, an alkyl-substituted phenyl group, or a $C_3$ to $C_{12}$ cycloalkyl group, and n is an integer of 0, 1, or 2.

11. The olefinic thermoplastic elastomer according to claim 8, wherein the copolymer of vinyl monomers and a radically polymerizable organic peroxide has a crosslinkable functional group.

12. The olefinic thermoplastic elastomer according to claim 8, wherein the ratio by weight of the grafting precursor to the acrylic rubber is 95:5 to 5:95.

13. The olefinic thermoplastic elastomer according to claim 8, the ingredients further including an olefin polymer or olefin copolymer formed from a nonpolar α-olefin monomer.

14. The olefinic thermoplastic elastomer according to claim 13, wherein the olefin polymer or olefin copolymer formed from a nonpolar α-olefin monomer is an oil-resistant ethylene-propylene copolymer.

15. The olefinic thermoplastic elastomer according to claim 8, the ingredients further including at least one additive selected from the group consisting of a plasticizer, an extender, a lubricant, and an antioxidant.

16. The olefinic thermoplastic elastomer according to claim 8, the ingredients further including at least one of other thermoplastic resins or rubbers.

17. A molding obtained by molding an olefinic thermoplastic elastomer obtained by melting and kneading ingredients, the ingredients including:
- a graft copolymer composed of an olefin co-polymer segment formed from a nonpolar α-olefin monomer, and a vinyl polymer segment formed from vinyl monomers, the vinyl monomers including at least styrene and butyl acrylate, wherein the graft copolymer has a polyphase structure in which one of the olefin co-polymer segment and the vinyl polymer segment form a dispersed phase in the other with a particle size of 0.01 to 1 μm, wherein the olefin co-polymer segment is an ethylene-propylene block copolymer with ethylene content of 10 wt % or less;
- an acrylic rubber formed from a monomer mixture in which 10 to 90 wt % of methoxyethyl acrylate, 5 to 85 wt % of alkyl acrylate, 5 to 15 wt % of acrylonitrile, and 0.1 to 10 wt % of allyl methacrylate are contained as main ingredients;
- 0.01 to 10 wt % of a crosslinking agent with respect to the total amount of the graft copolymer and the acrylic rubber; and
- 0.01 to 10 wt % of a co-crosslinking agent with respect to the total amount of the graft copolymer and the acrylic rubber.

18. The molding according to claim 17, wherein the molding is a hose or a seal.

19. A molding obtained by molding an olefinic thermoplastic elastomer obtained by melting and kneading ingredients, the ingredients including:
- a grafting precursor composed of particles of an olefin co-polymer formed from a nonpolar α-olefin monomer, and a copolymer of vinyl monomers and a radically polymerizable organic peroxide, the copolymer being dispersed in the particles, the vinyl monomers including at least styrene and butyl acrylate, wherein the olefin co-polymer segment is an ethylene-propylene block copolymer with ethylene content of 10 wt % or less;
- an acrylic rubber formed from a monomer mixture in which 10 to 90 wt % of methoxyethyl acrylate, 5 to 85 wt % of alkyl acrylate, 5 to 15 wt % of acrylonitrile, and 0.1 to 10 wt % of allyl methacrylate are contained as main components;
- 0.01 to 10 wt % of a crosslinking agent with respect to the total amount of the grafting precursor and the acrylic rubber;
- 0.01 to 10 wt % of a co-crosslinking agent with respect to the total amount of the grafting precursor and the acrylic rubber.

20. The molding according to claim 19, wherein the molding is a hose or a seal.

21. The olefinic thermoplastic elastomer according to claim 1, wherein the vinyl monomers further include hydroxypropyl methacrylate.

22. The olefinic thermoplastic elastomer according to claim 8, wherein the vinyl monomers further include hydroxypropyl methacrylate.

23. The molding according to claim 17, wherein the vinyl monomers further include hydroxypropyl methacrylate.

24. The molding according to claim 19, wherein the vinyl monomers further include hydroxypropyl methacrylate.

* * * * *